United States Patent [19]

Kawatani et al.

[11] 4,380,475
[45] Apr. 19, 1983

[54] PROCESS FOR PREPARING AQUEOUS DISPERSION OF ROSIN-BASE MATERIALS

[75] Inventors: Kimio Kawatani, Suita; Shigenori Tsujimoto, Hashimoto; Ryoji Kaji, Kawachinagano, all of Japan

[73] Assignee: Arakawa Kagaku Kogyo Kabushiki Kaisha, Japan

[21] Appl. No.: 288,156

[22] Filed: Jul. 29, 1981

[30] Foreign Application Priority Data

Aug. 6, 1980 [JP] Japan .................................. 55-108625

[51] Int. Cl.³ ............................................. C08L 93/04
[52] U.S. Cl. .................................................. 106/238
[58] Field of Search .................... 106/238; 260/101, 97

[56] References Cited

U.S. PATENT DOCUMENTS 4,199,369  4/1980  Hughes ............................... 106/238
4,203,776  5/1980  Greiner ............................... 106/238
4,267,099  5/1981  Okumichi et al. ................... 106/238

Primary Examiner—Theodore Morris
Attorney, Agent, or Firm—Larson and Taylor

[57] ABSTRACT

This invention provides a process for preparing an aqueous dispersion of a rosin-base material by an inversion method, the process being characterized in that the dispersant is at least one of compounds represented by the formula

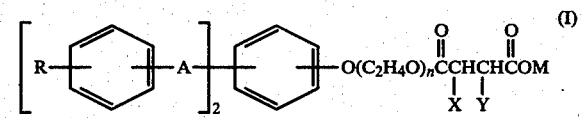

wherein R is hydrogen atom or lower alkyl group, A is straight-chain or branched-chain alkylene group having 2 or 3 carbon atoms, n is an integer of 4 to 25, one of X and Y is —SO$_3$M and the other thereof is hydrogen atom, and M is a monovalent cation.

The aqueous dispersion obtained by the process of the invention have excellent sizing effects, very high stabilities and greatly reduced foaming properties.

5 Claims, No Drawings

PROCESS FOR PREPARING AQUEOUS DISPERSION OF ROSIN-BASE MATERIALS

This invention relates to a process for preparing aqueous dispersions of rosin-base materials, and more particularly to a process for preparing aqueous dispersions of rosin-base materials by an inversion method with use of specified dispersants.

Papers, paper boards, wood fiber boards and like cellulose fiber products are produced usually from aqueous slurry of cellulose fibers containing sizing agents admixed therewith. For this purpose, fortified rosin sizing agents are generally used since such sizing agents are capable of giving the product resistance to water and to the penetration of ink. Further as such sizing agents, those in the form of aqueous dispersions have attracted attention in recent years. These sizing agents are prepared by processes in which a fortified rosin is dispersed in water in the presence of a suitable dispersant by a homogenizer with a high shearing force, or by inversion processes in which a dispersion of fortified rosin containing a suitable dispersant is subjected to phase inversion. The latter processes require none of special devices such as a homogenizer and are therefore very advantageous. Recently an inversion process has been proposed in which a salt of sulfuric acid ester of polyoxyethylene alkylphenyl ether is used for dispersing fortified rosins with good stability (Published Unexamined Japanese Patent Application No. 77206/1977). The dispersion obtained by this process, however, still remains to be improved in stabilities, especially in mechanical stability, is highly susceptible to foaming in itself especially when used for papermaking and requires use of a large amount of anti-foaming agent during transport as well as when placed into use.

Published Unexamined Japanese Patent Application No. 133259/1978 discloses another inversion process for preparing dispersions wherein a salt of sulfosuccinic acid ester of polyoxyethylene alkylphenyl ether is used as a dispersant, but the dispersion obtained is similarly inferior in mechanical stability and susceptible to foaming.

An object of the invention is to provide a process for preparing by the inversion method aqueous dispersions of rosin-base materials which are outstanding in stabilities, especially in mechanical stability.

Another object of the invention is to provide a process for preparing by the inversion method aqueous dispersions of rosin-base materials having greatly reduced susceptibility to foaming.

Still another object of the invention is to provide a process for preparing by the inversion method aqueous dispersions of rosin-base materials capable of giving outstanding sizing effects for papermaking.

These and other objects of the invention will become apparent from the following description.

The present invention provides a process for preparing an aqueous dispersion of a rosin-base material by mixing together a melt of the rosin-base material, a dispersant and water to obtain a dispersion comprising a continuous phase of the rosin-base material and a dispersed phase of the water, and adding water to the dispersion to invert the dispersion to the contemplated aqueous dispersion comprising a dispersed phase of the rosin-base material and a continuous phase of the water, the process being characterized in that the dispersant is at least one of compounds represented by the formula

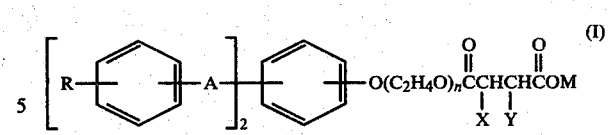

wherein R is hydrogen atom or lower alkyl group, A is straight-chain or branched-chain alkylene group having 2 or 3 carbon atoms, n is an integer of 4 to 25, one of X and Y is $-SO_3M$ and the other thereof is hydrogen atom, and M is a monovalent cation.

The present invention has been accomplished based on the following finding. We have conducted extensive research on dispersants for stabilizing rosin-base materials and consequently found that when rosin-base materials are dispersed in water by the inversion method with use of a specific compound of the foregoing formula (I) which has never been used for preparing aqueous dispersions of rosin-base materials, aqueous dispersions of rosin-base materials can be obtained which are outstanding in stabilities and in sizing effect and nevertheless have reduced foaming properties. Any of studies have never been conducted systematically on dispersants for stabilizing rosin-base materials. Our finding is indeed a surprising discovery in view of the fact that even compounds analogous in construction to the compounds of the formula (I) and having surface active properties fail to stabilize rosin-base materials.

As stated above, rosin-base materials, when dispersed in water by the inversion method with use of a specific dispersant of the formula (I) according to the invention, readily afford aqueous dispersions which are outstanding in stabilities and in sizing effect, have reduced foaming properties and are satisfactorily usable for papermaking systems almost without entailing the problem of foaming. It is especially noteworthy that the present process gives aqueous dispersions of such outstanding characteristics even when the specific dispersant of the formula (I) is used in a small amount of about 2% by dry weight based on the rosin-base material. Such effects are by no means achievable by the processes of the foregoing publications wherein salts of sulfuric acid ester or sulfosuccinic acid ester of polyoxyethylene ether are used as dispersants, as will be apparent from Tables 1 and 2 given later. In fact, when the disclosed dispersants are used for these processes in an amount of 2% by weight, the resulting dispersions are of low stability and become unusable in about 1 day due to the separation of water, and even before the separation of water, the dispersions have a very low sizing effect and are not satisfactorily usable. Although somewhat improved stabilities will result when the known dispersants are used in an increased amount (for example, of 4% by weight) for these processes, the dispersions are still low in mechanical stability, whereas the use of increased amounts of the dispersants is not economical and produces greatly enhanced foaming properties, with the resulting disadvantage that the dispersions require a long period of time for defoaming.

The rosin-base materials to be dispersed in water according to this invention comprise 0 to 95% by weight of rosins and 5 to 100% by weight of fortified rosins. When desired, the rosin-base materials may further contain up to 50% by weight of extenders for fortified rosins. Examples of useful rosins are gum rosin, wood rosin, tall oil rosin, modified products of these rosins and mixtures thereof. Examples of useful modified rosins are hydrogenated rosins, disproportionated rosins, polymerized rosins, aldehyde-modified rosins, etc. Among these rosins, aldehyde-modified rosins, for example, can be prepared by reacting a rosin with 2 to 8% by weight, based on the rosin, of formaldehyde or acetaldehyde in the presence of an acid catalyst, such as sulfuric acid or p-toluenesulfonic acid, at a temperature of about 140° to about 200° C. for 0.5 to 3 hours. Fortified rosins can be prepared, for example, by reacting a rosin with an α,β-unsaturated carboxylic acid in an amount of 2 to 30% by weight, preferably 3 to 15% by weight, based on the rosin with heating at about 150° to 250° C. Examples of useful α,β-unsaturated carboxylic acids are acrylic acid, maleic acid, fumaric acid, itaconic acid, anhydrides of these acids and mixtures thereof, among which fumaric acid, maleic acid and maleic anhydride are especially preferable. Examples of fortified rosin extenders which may be incorporated into the rosin-base materials are paraffin wax, microcrystalline wax and like waxes, petroleum resins, terpene resins, hydrogenated products of such resins, and like hydrocarbon resins. When the rosin-base materials are extended, the extended rosin-base materials preferably comprise at least 25% by weight of fortified rosins and up to 50% by weight of the extenders, based on the combined weight of the rosin-base materials and the extenders.

According to this invention, it is critical to use at least one of the dispersants of the formula (I). Examples of the lower alkyl groups represented by R in the formula (I) are methyl, ethyl, propyl, butyl, etc. Examples of alkylene groups represented by A are ethylene, methylmethylene, dimethylmethylene, etc. Exemplary of the monovalent cations represented by M are alkali metal ions, such as lithium, sodium potassium, cesium, etc., and ammonium groups derived from ammonia and various amines, such as trimethylamine, dimethylamine, diethylamine, triethanolamine, etc. The value represented by n is integer of 4 to 25, preferably integer of 6 to 18. Typical of preferred groups

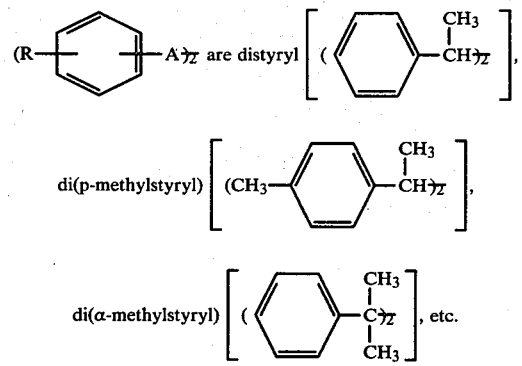

The compound of the formula (I) useful as a dispersant is prepared easily, for example, by esterifying the corresponding known di-substituted phenyl polyoxyethylene ether and sulfosuccinic anhydride, or by esterifying the ether and maleic anhydride and sulfonating the resulting ester. The esterification, as well as the sulfonation, can be carried out in the usual manner. The above process usual gives a mixture of a compound of the formula (I) wherein X is —$SO_3M$ (in which M is as defined above) and a compound of the formula (I) wherein Y is —$SO_3M$ (in which M is as defined above). These compounds are effectively usable as dispersants of the invention in the form of a mixture without separation, or even when in the form of a reaction mixture containing small amounts of unreacted materials. It is of course possible to use these compounds individually as separated from the unreacted materials and isolated from each other.

The process of this invention is practiced by the inversion process. In this case, at least one of the dispersants is used usually in an amount of about 0.5 to about 10% by weight, preferably about 1 to about 8% by weight, of the rosin-base material. Although more than 10% by weight of the dispersant may be used, it is not economical. The dispersants of the formula (I) have the advantage that the use thereof gives aqueous dispersions with the contemplated properties even if in a small amount, for example, of about 1 to about 2% by weight of the rosin-base material.

More specifically the above inversion process is practiced in the following manner. A molten rosin-base material is prepared by heating a fortified rosin and, when desired, a rosin and/or an extender, with stirring. Preferably the heating is conducted at a temperature at least about 20° C. higher than the softening point of the rosin-base material. The preferred heating temperature is generally about 90° to about 160° C., although variable depending on the proportions of the fortified rosin, rosin and extender.

Subsequently an aqueous solution of a specified dispersant, or the dispersant and water are added to the molten rosin-base material with stirring to prepare a dispersion in which the continuous phase is the rosin-base material and the dispersed phase is the water. The amount of water to be used is so adjusted that the resulting dispersion will contain about 70 to about 90% by weight of solids.

Hot water (for inversion) having a temperature of about 70° to about 100° C. is then added to the dispersion with vigorous stirring. The phase inversion of the dispersion usually takes place when the amount of water in the resulting dispersion exceeds about 30% by weight of the whole amount of the resulting dispersion, thus giving a dispersion containing the rosin-base material as dispersed in the continuous phase of water. When desired, water or an aqueous alkali solution can be added to the dispersion for dilution and/or pH adjustment. The alkali solution is used preferably in such an amount that the resulting dispersion will have a pH of up to about 6.

The aqueous dispersion thus prepared usually comprises about 5 to about 70% by weight, preferably about 30 to about 55% by weight, of the rosin-base material; about 0.5 to about 10% by weight, preferably about 1 to about 8% by weight, based on the rosin-base material, of the dispersant; and the balance water. The dispersion comprises the rosin-base material as uniformly dispersed therein in the form of finely divided particles. The particles preferably are up to 1 μm in diameter which are predominantly up to 0.5 μm in diameter. The dispersion usually has a milk-white appearance and a pH of about 3.5 to about 6. The dispersion obtained by the process of the invention remains stable at room temperature for at least 2 months free of any precipitation and possesses greatly reduced susceptibility to foaming that is usually attendant on the use of dispersants. As will be apparent from the Examples given later, the dispersion has high mechanical and dilution stabilities.

The aqueous dispersions obtained by the present process are useful for preparing papers, paper boards, fiber boards, etc. from cellulose fibers and also from mixtures of cellulose fibers and mineral fibers, such as asbestos, rock wool, etc. or synthetic fibers, such as polyamide, polyester, polyolefin and like fibers.

When the aqueous dispersions of this invention are used as papermaking sizing agents, the dispersion is added to an aqueous slurry of pulp along with alum or like fixing agent, and the resulting slurry is made into sheets at a pH of about 4 to about 6. Alternatively, the dispersion is added to an aqueous slurry of pulp along with a small amount of alum or like fixing agent and a very small amount of a cationic auxiliary fixing agent and, the resulting slurry is made into sheets at a pH of about 5 to about 7, as disclosed in Published Examined Japanese Patent Application No. 30201/1974. The present dispersions are usually used in an amount of about 0.05 to about 3% by weight, based on the dry weight, of the pulp. The aqueous dispersions of the present invention have high dilution stability such that they can be satisfactorily diluted with river water, tap water, well water or like water, and can be readily and uniformly dispersed in pulp slurries. The diluted dispersions remain stable over a prolonged period of time.

The aqueous dispersions of this invention are usable also as surface sizing agents. In this case, the dispersions are applied to wet sheets of paper in the usual manner as by spraying, immersion or coating.

The process of this invention for preparing aqueous dispersions will be described below in greater detail with reference to Examples and Comparison Examples. Reference Examples show the process for preparing rosin-base materials useful for this invention. In each of the examples the parts and percentages are all by weight unless otherwise indicated.

The properties of the aqueous dispersions are determined by the following methods.

(1) Mechanical stability

A 50 g quantity of the aqueous dispersion is placed into the container of Maron-type stability tester (product of Shinsei Sangyo Co., Ltd., Japan) and subjected to mechanical shear under a load of 10 kg, at 25° C. and at a rotational speed of 1000 r.p.m. for 5 minutes. By the shearing action, agglomerates are formed. The resulting agglomerates are filtered off with a 100-mesh stainless steel screen. The mechanical stability is calculated from the following equation:

Mechanical stability (%) = $W_1/W_0 \times 100$ in which $W_1$ is the weight of completely dried agglomerates, and $W_0$ is the weight of completely dried dispersion specimen.

(2) Dilution stability

The aqueous dispersion is diluted to a concentration of 5% at 25° C. with water having a hardness of 10° DH. The diluted dispersion is checked with the unaided eye to measure the time taken for the flocculation of the dilution.

(3) Foaming properties (a)

The aqueous dispersion is diluted with deionized water to a concentration of 5%, and the dilution is tested according to JIS K 3362 to determine the height (mm) of the foam formed.

(4) Foaming properties (b)

To a 1% aqueous slurry of pulp (L-BKP) are added 5% (by completely dry weight) of the aqueous dispersion and 2.5% of alum, based on the pulp. The aqueous mixture obtained (1 liter) is placed into a device specified in JIS K 3362 and then circulated through the device by a pump at a rate of 8 liters/min for 10 minutes. Immediately after the circulation is discontinued, the height (mm) of the foam formed is measured.

REFERENCE EXAMPLE 1

Tall oil rosin (1800 parts) is melted by heating, and 2.7 parts of p-toluenesulfonic acid monohydrate serving as a catalyst is added to the molten rosin at 165° C. with stirring. Subsequently 118 parts of 37% aqueous solution of formaldehyde is added to the mixture at 160° to 170° C. over a period of 90 minutes. The mixture is further stirred at the same temperature for 1 hour to obtain formaldehyde-modified rosin, to which 1200 parts of gum rosin is added. The resulting mixture is stirred at 175° C. for 1 hour.

The mixture (2950 parts) and 177 parts of fumaric acid are melted by heating and reacted at 200° C. for 3 hours to give a rosin-base material (I) having an acid value of 208 and a softening point of 103.5° C. as measured by the ring-and-ball method (same as hereinafter).

REFERENCE EXAMPLE 2

Gum rosin (1000 parts) and 190 parts of fumaric acid are melted and heated at 200° C. for 4 hours for reaction. The resulting fortified rosin has an acid value of 286 and a softening point of 138.5° C.

The fortified rosin (550 parts) and 500 parts of gum rosin are heated at 170° C. and mixed together for 30 minutes to obtain a rosin-base material (II).

REFERENCE EXAMPLE 3

Gum rosin (1000 parts) is melted and heated at 165° C., and 0.95 part of p-toluenesulfonic acid monohydrate serving as a catalyst is added to the molten rosin with stirring. Subsequently 54 parts of 37% aqueous solution of formaldehyde is added to the mixture at 160° to 170° C. over a period of 90 minutes. The mixture is further stirred at the same temperature for 1 hour to obtain formaldehydemodified rosin, to which 90 parts of fumaric acid is added. The mixture is reacted at 200° C. for 3 hours, affording a rosin-base material (III) having an acid value of 230 and a softening point of 125° C.

EXAMPLES 1 and 2

The rosin-base material (I) (100 parts) obtained in Reference Example 1 is placed into a flask equipped with a stirrer and a thermometer, and then heated to 150° C. and melted. A 10 part portion (for Example 1) or 20 part portion (for Example 2) of 20% aqueous solution of sodium salts of polyoxyethylene (average polymerization degree: 13)distyrylphenylether sulfosuccinic acid half ester (a mixture of a compound of the formula (I) wherein X is —$SO_3Na$ and a compound of the same formula wherein Y is —$SO_3Na$, n being 13 for both compounds) is added to the molten rosin-base material with stirring over a period of 2 to 3 minutes. During the addition, a considerable amount of water evaporates off, with a reduction of the temperature to 93° C. Subsequently 20 parts of hot water (95° C.) is added to the mixture to afford a creamy water-in-oil dispersion. While stirring the dispersion vigorously, 70 parts of hot water (90° C.) is further added to the dispersion over a period of 1 minute. This gives rise to phase inversion, giving an oil-in-water dispersion, which is rapidly cooled from outside to a temperature of 30° C., then passed through a 100-mesh screen and placed into a glass bottle. No coagulant is found on the screen. The aqueous dispersion thus prepared is found to contain substantially the same amount of rosin-base material as the rosin-base material used (at least 98% in yield). Table 1 shows the properties of the dispersions.

COMPARISON EXAMPLES 1 and 2

For comparison, aqueous dispersions are prepared in the same manner as in Examples 1 and 2 except that the dispersant of the formula (I) is replaced by sodium salt of polyoxyethylene(average polymerization degree: 10)nonylphenylether sulfuric acid half ester. Table 1 shows the properties of the dispersions.

COMPARISON EXAMPLES 3 and 4

For comparison, aqueous dispersions are prepared in the same manner as in Examples 1 and 2 except that the dispersant of the formula (I) is replaced by sodium salt of polyoxyethylene(average polymerization degree: 9)nonylphenylether sulfosuccinic acid half ester. Table 1 shows the properties of the dispersions.

sizing degree of the paper specimen thus prepared is then measured. Table 2 shows the results.

TABLE 2

| Aqueous dispersion used | Amount of aqueous dispersion | |
|---|---|---|
| | 0.2% | 0.5% |
| Example 1 | 18.5 | 26.4 |
| Example 2 | 22.3 | 28.7 |
| Comp. Ex. 1 | 2.3 | 13.8 |
| Comp. Ex. 2 | 20.2 | 25.4 |
| Comp. Ex. 3 | 3.5 | 15.0 |
| Comp. Ex. 4 | 21.8 | 27.3 |

Table 2 shows that compared with the dispersions comprising 4% by weight, based on the rosin-base material, of the known dispersants, the aqueous dispersions of the invention produce approximately equivalent sizing effects even when comprising only 2% by weight of the dispersants of the formula (I).

The aqueous dispersions incorporating 2% by weight of comparison dispersants produce only a very low sizing effect and are now fully useful even when used in an amount of 0.5% of the pulp based on the dry weight.

TABLE 1

| | Amount* of dispersant (%) | Properties of aqueous dispersion | | | | | Foaming properties | |
|---|---|---|---|---|---|---|---|---|
| | | Conc. (%) | Particle size (μ) | Stabilities | | | (a) (mm) | (b) (mm) |
| | | | | Mechanical (%) | Dilution (hr) | Storage | | |
| Example 1 | 2 | 50.6 | 0.5–1 | 0.7 | >24 | At least 2 months | 48 | 5 |
| Example 2 | 4 | 51.5 | 0.3 | 0.4 | " | At least 2 months | 95 | 10 |
| Comp. Ex. 1 | 2 | 44.8 | 2 | — | — | Separation in 1 day** | 62 | 51 |
| Example 2 | 4 | 48.0 | 0.3 | 1.3 | >24 | At least 2 months | 153 | 88 |
| Example 3 | 2 | 49.3 | 2 | — | — | Separation in 1 day** | 78 | 19 |
| Example 4 | 4 | 50.1 | 0.3 | 2.5 | >24 | At least 2 months | 175 | 41 |

*Based on dry weight relative to the rosin-base material.
**Separation of water.

Table 1 shows that the use of specified dispersants of the formula (I) according to the invention affords aqueous dispersions having higher mechanical, dilution and storage stabilities and substantially lower foaming properties than those obtained with use of comparison dispersants in Comparison Examples 1 to 4. The use of the dispersant of the invention in an amount of only 2% by weight of the rosin-base material (based on the dry weight) gives an aqueous dispersion which remains stable for at least 2 months as contemplated, whereas the dispersants of the Comparison Examples, if used in the same amount, afford unstable dispersions in which water separates in only 1 day.

<Sizing Test>

The aqueous dispersions prepared in Examples 1 and 2 and Comparison Examples 1 to 4 are used as paper-making sizing agents, and the sizing degrees (seconds) of the papers are measured according to the Stöckigt method (JIS P 8122).

Pulp (L-BKP) beaten to 30° SR is formulated into a 1% aqueous slurry, with which are admixed 0.2% or 0.5% of the aqueous dispersion first, and then 2.5% of alum, based on the dry weight relative to the pulp, to prepare a uniform stock. With use of a TAPPI standard sheet machine, the stock is made into a sheet weighing 60±1 g/m². The sheet is dewatered at a pressure of 5 kg/cm² for 3 minutes, dried at 80° C. for 5 minutes and conditioned at 20° C. and 65% RH for 24 hours. The

EXAMPLES 3 to 6

Stable aqueous dispersions are prepared in the same manner as in Example 2 with the exception of using the rosin-base material (II) in place of the rosin-base material (I) and the compounds listed in Table 3 below as dispersants. In Table 3 the value n shows average polymerization degree. The yields achieved are approximately 100%, and the dispersions are composed of particles 0.2 to 0.3 μm in size.

TABLE 3

| Example | Dispersant |
|---|---|
| 3 | Sodium salt of polyoxyethylene(n = 9)distyrylphenylether sulfosuccinic acid half ester |
| 4 | Sodium salt of polyoxyethylene(n = 11)di(p-methylstyryl)phenylether sulfosuccinic acid half ester |
| 5 | Sodium salt of polyoxyethylene(n = 15)distyrylphenylether sulfosuccinic acid half ester |
| 6 | Sodium salt of polyoxyethylene(n = 13)di(α-methylstyryl)phenylether sulfosuccinic acid half ester |

EXAMPLE 7

A stable aqueous dispersion is prepared in the same manner as in Example 2 except that the rosin-base material (III) is used in place of the rosin-base material (I).

The dispersion is obtained in a yield of about 100% and composed of particles of approximately the same size as those obtained in Example 2.

The dispersions obtained in Examples 3 to 7 are tested for foaming properties and sizing effect. Table 4 below shows the results.

TABLE 4

| Example | Foaming properties | | Sizing effect (sec) Amount | |
|---|---|---|---|---|
| | (a) (mm) | (b) (mm) | 0.2% | 0.5% |
| 3 | 47 | 9.0 | 20.5 | 27.0 |
| 4 | 53 | 9.5 | 21.3 | 25.8 |
| 5 | 50 | 10.2 | 22.5 | 26.9 |
| 6 | 48 | 9.0 | 21.8 | 28.6 |
| 7 | 55 | 9.3 | 23.2 | 28.1 |

We claim:

1. A process for preparing an aqueous dispersion of a rosin-base material by mixing together a melt of the rosin-base material, a dispersant and water to obtain a dispersion comprising a continuous phase of the rosin-base material and a dispersed phase of the water, and adding water to the dispersion to invert the dispersion to the contemplated aqueous dispersion comprising a dispersed phase of the rosin-base material and a continuous phase of the water, the process being characterized in that the dispersant is at least one of compounds represented by the formula

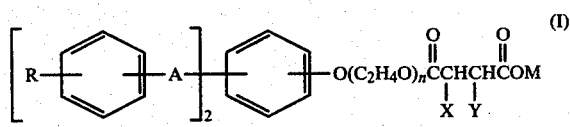

wherein R is hydrogen atom or lower alkyl group, A is straight-chain or branched-chain alkylene group having 2 or 3 carbon atoms, n is an integer of 4 to 25, one of X and Y is —SO$_3$M and the other thereof is hydrogen atom, and M is a monovalent cation, and is present in an amount of about 0.5 to about 10% by weight of the rosin-base material.

2. A process as defined in claim 1 wherein

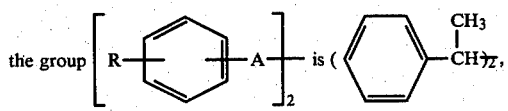

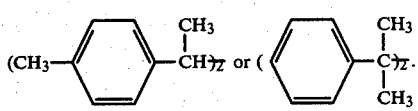

3. A process as defined in claim 1 wherein n is an integer of 6 to 18.

4. A process as defined in claim 1 wherein the dispersant is used in an amount of about 1 to about 8% by weight of the rosin-base material.

5. An aqueous dispersion of rosin-base material prepared by the process as defined in any one of claims 1, 2, 3 or 4.

* * * * *